United States Patent
Shi (10) Patent No.: US 11,357,058 B2
(45) Date of Patent: Jun. 7, 2022

(54) METHOD FOR TRANSMITTING RANDOM ACCESS PREAMBLE, AND TERMINAL DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP.. LTD., Guangdong (CN)

( * ) Notice: Subject to any disclaimer, the term of this patent is extended or adjusted under 35 U.S.C. 154(b) by 0 days.

(21) Appl. No.: 16/898,415

(22) Filed: Jun. 10, 2020

(65) Prior Publication Data

US 2020/0305204 A1    Sep. 24, 2020

Related U.S. Application Data (63) Continuation of application No. PCT/CN2017/117566, filed on Dec. 20, 2017.

(51) Int. Cl.
| | |
|---|---|
| *H04W 4/00* | (2018.01) |
| *H04W 74/08* | (2009.01) |
| *H04W 76/18* | (2018.01) |
| *H04W 76/27* | (2018.01) |
| *H04W 12/06* | (2021.01) |

(Continued)

(52) U.S. Cl.
CPC ....... *H04W 74/0833* (2013.01); *H04W 12/06* (2013.01); *H04W 52/36* (2013.01); *H04W 72/046* (2013.01); *H04W 76/18* (2018.02); *H04W 76/27* (2018.02)

(58) Field of Classification Search
CPC ..... H04W 12/06; H04W 52/36; H04W 76/27; H04W 74/0833; H04W 76/18; H04W 72/046
USPC ........................................................ 370/329
See application file for complete search history.

(56) References Cited

U.S. PATENT DOCUMENTS

| | | |
|---|---|---|
| 2015/0016312 A1 | 1/2015 | Li et al. |
| 2015/0296525 A1 | 10/2015 | Kim et al. |
| 2016/0338053 A1 | 11/2016 | Park et al. |

(Continued)

FOREIGN PATENT DOCUMENTS

| | | |
|---|---|---|
| CN | 105873229 A | 8/2016 |
| CN | 106102182 A | 11/2016 |

(Continued)

OTHER PUBLICATIONS

3GPP TSG-RAN WG1#89—Hangzhou, China, May 15-19, 2017—R1-1708244—Nokia, Alcatel-Lucent Shanghai Bell, NR 4-step RACH procedure (12 pages).

(Continued)

*Primary Examiner* — Huy C Ho
(74) *Attorney, Agent, or Firm* — Perkins Coie LLP (57) ABSTRACT

Implementations of the present disclosure relate to a method for transmitting a random access preamble, and a terminal device. The method comprises: performing the i-th transmission of a random access preamble, i being a positive integer greater than 1; and if the i-th transmission of the random access preamble is performed by the same wave beam as the (i−1)-th transmission, incrementing the value of a power ramping counter of the random access preamble by 1.

18 Claims, 3 Drawing Sheets

100

Perform i-th transmission of the random access preamble, wherein i is a positive integer greater than 1 — S110

If the i-th transmission and (i-1)-th transmission of the random access preamble uses a same beam, increase a value of a power ramping counter of the random access preamble by 1 — S120

(51) Int. Cl.
  *H04W 52/36*  (2009.01)
  *H04W 72/04*  (2009.01)

(56) References Cited

U.S. PATENT DOCUMENTS

2017/0251460 A1 8/2017 Agiwal et al.
2019/0394805 A1* 12/2019 Kim ..................... H04W 56/00

FOREIGN PATENT DOCUMENTS

| CN | 106922033 A | 7/2017 |
| WO | 2016086144 A1 | 6/2016 |
| WO | 2017020293 A1 | 2/2017 |

OTHER PUBLICATIONS

3GPP TSG-RAN WG2 meeting #99bis—R2-1710001—Prague, Czech Republic, Oct. 9-13, 2017—ETSI MCC, Report of 3GPP TSG RAN2#99 meeting, Berlin, Germany (235 pages).
Supplementary European Search Report dated Nov. 4, 2020 of European Patent Application No. 17935106.9 (10 pages).
International Search Report dated Sep. 11, 2018 of PCT/CN2017/117566 (4 pages).
EPO, Examination Report for European Application No. 17935106.9. dated Sep. 10, 2021. 7 pages.
IP India, Examination Report for Indian Application No. 202017028941. dated Jul. 15, 2021. 5 pages with English translation.

* cited by examiner

100

> Perform i-th transmission of the random access preamble, wherein i is a positive integer greater than 1 — S110

> If the i-th transmission and (i-1)-th transmission of the random access preamble uses a same beam, increase a value of a power ramping counter of the random access preamble by 1 — S120

> Determine that a transmission resource for transmitting a random access preamble belongs to an authorized frequency band or an unauthorized frequency band — S210

> If the transmission resource belongs to the authorized frequency band, set a maximum value of transmission times of the random access preamble to a first value — S220

> If the transmission resource belongs to the unauthorized frequency band, set the maximum value of the transmission times to a second value, wherein the first value is different from the second value — S230

METHOD FOR TRANSMITTING RANDOM ACCESS PREAMBLE, AND TERMINAL DEVICE

CROSS-REFERENCE TO RELATED APPLICATION

This application is a continuation application of International Application No. PCT/CN2017/117566 filed on Dec. 20, 2017, the entire content of which is hereby incorporated by reference.

TECHNICAL FIELD

The present disclosure relates to the field of communication, in particular to a method for transmitting a random access preamble, and a terminal device.

BACKGROUND

In a random access process of a long term evolution (LTE) system, a media access control (MAC) entity in a terminal device only maintains a counter of transmission times of a random access preamble (PREAMBLE_TRANSMISSION_COUNTER). The counter is not only used for counting of power ramping, but also for counting transmission times of a preamble, thus limiting a maximum transmission times of a random access channel (RACH).

When a RACH process is initiated, an initial value of the PREAMBLE_TRANSMISSION_COUNTER is set to 1. After transmission of Msg1 is completed, if reception of a random access response (RAR) of a terminal fails or contention fails, the PREAMBLE_TRANSMISSION_COUNTER is increased by 1, until the PREAMBLE_TRANSMISSION_COUNTER reaches a maximum value. In addition, a transmission power of the Msg1 is also determined by the PREAMBLE_TRANSMISSION_COUNTER each time a RACH is re-initiated.

And in a new radio (NR) system, in order to support beam forming, two counters are introduced, one is a PREAMBLE_TRANSMISSION_COUNTER, and another one is a power ramping counter (PREAMBLE_POWER_RAMPING_COUNTER) set to calculate power ramping. However, how to maintain these two counters is a problem to be solved.

SUMMARY

The present disclosure provides a method for transmitting a random access preamble, and a terminal device, which can enable a terminal device to determine a power ramping counter of a random access preamble, according to whether a transmission beam changes or not; and to set a corresponding maximum value of transmission times of the random access preamble, according to whether a transmission resource of transmitting the random access preamble belongs to an unauthorized frequency band.

In a first aspect, a method for transmitting a random access preamble is provided, including: performing an i-th transmission of the random access preamble, where i is a positive integer greater than 1; if the i-th transmission and an (i−1)-th transmission of the random access preamble use a same beam, increasing a value of a power ramping counter of the random access preamble by 1.

Therefore, in the method for transmitting a random access preamble in the implementation of the present disclosure, the terminal device includes PREAMBLE_POWER_RAMPING_COUNTER for recording power ramping, and if a non-first transmission of the random access preamble (hereinafter referred to as "preamble") performed by the terminal device uses a same beam as a previous transmission, i.e., change of the beam does not occur, a value of the PREAMBLE_POWER_RAMPING_COUNTER corresponding to the preamble is increased by 1; if the change of the beam occurs, the value of the PREAMBLE_POWER_RAMPING_COUNTER remain unchanged, i.e. the PREAMBLE_POWER_RAMPING_COUNTER of the terminal device supports the power ramping to remain unchanged when beam switching occurs in a preamble transmission process.

In combination with the first aspect, in an implementation of the first aspect, before increasing the value of the power ramping counter of the random access preamble by 1, the method further includes: determining that there is no need to suspend the power ramping counter.

In combination with the first aspect and the above implementation thereof, in another implementation of the first aspect, the method further includes: if the i-th transmission and the (i−1)-th transmission of the random access preamble use a same synchronization signal block, determining that the i-th transmission and the (i−1)-th transmission of the random access preamble use the same beam.

In combination with the first aspect and the above implementation thereof, in another implementation of the first aspect, before performing the i-th transmission of the random access preamble, the method further includes: determining a first preset time-frequency resource in at least one preset time-frequency resource, wherein the first preset time-frequency resource is used for the i-th transmission of the random access preamble.

In combination with the first aspect and the above implementation thereof, in another implementation of the first aspect, determining the first preset time-frequency resource in the at least one preset time-frequency resource, includes: determining whether a second preset time-frequency resource in the at least one preset time-frequency resource is occupied; if the second preset time-frequency resource is not occupied, determining the second preset time-frequency resource as the first preset time-frequency resource; or, if the second preset time-frequency resource is occupied, determining whether another preset time-frequency resource other than the second preset time-frequency resource in the at least one preset time-frequency resource is occupied.

In combination with the first aspect and the above implementation thereof, in another implementation of the first aspect, determining whether the second preset time-frequency resource in the at least one preset time-frequency resource is occupied, includes: determining an energy value of a signal borne by the second preset time-frequency resource; if the energy value of the signal is less than or equal to a preset energy value, determining that the second preset time-frequency resource is not occupied; or, if the energy value of the signal is greater than a preset energy value, determining that the second preset time-frequency resource is not occupied.

In combination with the first aspect and the above implementation thereof, in another implementation of the first aspect, the value of the power ramping counter after the i-th transmission of the random access preamble is used for determining a (i+1)-th transmission power of the random access preamble.

In combination with the first aspect and the above implementation thereof, in another implementation of the first aspect, after performing the i-th transmission of the random access preamble, the method further includes: if determining that the i-th transmission of the random access preamble fails, increasing a value of a counter of transmission times of the random access preamble by 1, wherein the counter of the transmission times is used for recording the transmission times of the random access preamble.

In combination with the first aspect and the above implementation thereof, in another implementation of the first aspect, after increasing the value of the counter of the transmission times of the random access preamble by 1, the method further includes: if the value of the counter of the transmission times is less than or equal to a maximum value of the transmission times of the random access preamble, performing (i+1)-th transmission of the random access preamble; or, if the value of the counter of the transmission times is greater than the maximum value of the transmission times, determining that the random access process fails.

In combination with the first aspect and the above implementation thereof, in another implementation of the first aspect, after determining that the random access process fails, the method further includes: determining a receiving cell of the random access preamble as a primary cell; and sending a radio resource control (RRC) signaling to a network device corresponding to the primary cell, wherein the RRC signaling is used for indicating a radio link failure.

In combination with the first aspect and the above implementation thereof, in another implementation of the first aspect, the method further includes: determining that a transmission resource for transmitting the random access preamble belongs to an authorized frequency band or an unauthorized frequency band; if the transmission resource belongs to the authorized frequency band, setting a maximum value of transmission times of the random access preamble to a first value; or, if the transmission resource belongs to the unauthorized frequency band, setting the maximum value of the transmission times to a second value, wherein the first value is different from the second value.

In combination with the first aspect and the above implementation thereof, in another implementation of the first aspect, the first value is less than the second value.

In combination with the first aspect and the above implementation thereof, in another implementation of the first aspect, the method further includes: receiving configuration information sent by a network device, wherein the configuration information includes the first value and/or the second value.

Therefore, in the method for transmitting a random access preamble in the implementation of the present disclosure, the terminal device includes PREAMBLE_POWER_RAMPING_COUNTER for recording power ramping, and if a non-first transmission of a preamble performed by the terminal device uses a same beam as a previous transmission, that is, change of the beam does not occur, a value of the PREAMBLE_POWER_RAMPING_COUNTER corresponding to the preamble is increased by 1; if the change of the beam occurs, the value of the PREAMBLE_POWER_RAMPING_COUNTER remains unchanged, i.e. the PREAMBLE_POWER_RAMPING_COUNTER of the terminal device supports ensuring that power ramping remains unchanged when beam switching occurs in a preamble transmission process.

In a second aspect, a method for transmitting a random access preamble is provided, including: determining that a transmission resource for transmitting a random access preamble belongs to an authorized frequency band or an unauthorized frequency band; if the transmission resource belongs to the authorized frequency band, setting a maximum value of transmission times of the random access preamble to a first value; or, if the transmission resource belongs to the unauthorized frequency band, setting the maximum value of the transmission times to a second value, wherein the first value is different from the second value.

Therefore, in the method for transmitting a random access preamble according to the implementation of the present disclosure, the terminal device may set a maximum value of transmission times of a preamble according to whether a resource of transmitting the preamble belongs to an unauthorized frequency band. If the resource of transmitting the preamble belongs to an authorized resource, the maximum value of the transmission times is set to a first value correspondingly; if the resource of transmitting the preamble belongs to the unauthorized frequency band, the maximum value of the transmission times is set to a second value correspondingly, and the first value is different from the second value, for example, the second value is set to be greater than the first value, thereby reducing a probability of determining, by the terminal device, a random access process fails due to a listen before talk (LBT) failure.

In combination with the second aspect, in an implementation of the second aspect, the first value is less than the second value.

In combination with the second aspect and the above implementation thereof, in another implementation of the second aspect, the method further includes: receiving configuration information sent by a network device, wherein the configuration information includes the first value and/or the second value.

In combination with the second aspect and the above implementation thereof, in another implementation of the second aspect, the method further includes: if the i-th transmission of the random access preamble fails, increasing a value of a counter of transmission times of the random access preamble by 1, wherein the counter of the transmission times is used for recording the transmission times of the random access preamble, where i is a positive integer. In combination with the second aspect and the above implementation thereof, in another implementation of the second aspect, after increasing the value of the counter of the transmission times of the random access preamble by 1, the method further includes: if the value of the counter of the transmission times is less than or equal to the maximum value of the transmission times, performing (i+1)-th transmission of the random access preamble; or, if the value of the counter of the transmission times is greater than the maximum value of the transmission times, determining that a random access process fails.

In combination with the second aspect and the above implementation thereof, in another implementation of the second aspect, after determining that the random access process fails, the method further includes: determining a receiving cell of the random access preamble as a primary cell; and sending an RRC signaling to a network device corresponding to the primary cell, wherein the RRC signaling is used for indicating a radio link failure.

In combination with the second aspect and the above implementation thereof, in another implementation of the second aspect, the method further includes: determining whether a first resource in the transmission resource is occupied; if the first resource is occupied, determining whether another resource other than the first resource in the transmission resource is occupied; if the first resource is not occupied, using the first resource to perform the i-th transmission of the random access preamble.

In combination with the second aspect and the above implementation thereof, in another implementation of the second aspect, after determining whether the another resource other than the first resource in the transmission resource is occupied if the first resource is occupied, the method further includes: if there is no unoccupied resource in the transmission resource, determining that the i-th transmission of the random access preamble fails.

Therefore, in the method for transmitting a random access preamble according to the implementation of the present disclosure, the terminal device may set a maximum value of transmission times of a preamble according to whether a resource of transmitting the preamble belongs to an unauthorized frequency band. If the resource of transmitting the preamble belongs to an authorized resource, the maximum value of the transmission times is set to a first value correspondingly; if the resource of transmitting the preamble belongs to the unauthorized frequency band, the maximum value of the transmission times is set to a second value correspondingly, and the first value is different from the second value, for example, the second value is set to be greater than the first value, thereby reducing a probability of determining, by the terminal device, a random access process fails due to an LBT failure.

In a third aspect, a terminal device is provided, which is used for performing the method in the first aspect or any possible implementation of the first aspect. Specifically, the terminal device includes units for performing the method in the first aspect or any possible implementation of the first aspect.

In a fourth aspect, a terminal device is provided or performing the method in the second aspect or any possible implementation of the second aspect. Specifically, the terminal device includes units for performing the method in the second aspect or any possible implementation of the second aspect.

In a fifth aspect, a terminal device is provided. The terminal device includes a memory and a processor, the memory is configured to store instructions, the processor is configured to execute the instructions stored in the memory, and when the processor executes the instructions stored in the memory, the execution enables the processor to perform the method in the first aspect or any possible implementation of the first aspect.

In a sixth aspect, a terminal device is provided, including: a memory and a processor, wherein the memory is configured to store instructions, the processor is configured to execute the instructions stored in the memory, and when the processor executes the instructions stored in the memory, the execution enables the processor to perform the method in the second aspect or any possible implementation of the second aspect.

In a seventh aspect, a computer readable medium is provided, which is configured to store a computer program, the computer program includes instructions for performing the method in the first aspect or any possible implementation of the first aspect.

In an eighth aspect, a computer readable medium is provided, which is configured to store a computer program, and the computer program includes instructions for performing the method in the second aspect or any possible implementation of the second aspect.

In a ninth aspect, a computer program product including instructions is provided, wherein when a computer executes the instructions of the computer program product, the computer performs the method for transmitting a random access preamble in the first aspect or any possible implementation of the first aspect. Specifically, the computer program product may be run on the terminal device of the third aspect.

In a tenth aspect, a computer program product including instructions is provided, wherein when a computer executes the instructions of the computer program product, the computer performs the method for transmitting a random access preamble in the second aspect or any possible implementation of the second aspect. Specifically, the computer program product may be run on the terminal device of the fourth aspect.

DETAILED DESCRIPTION

Hereinafter, technical solutions in implementations of the present disclosure will be described with reference to accompanying drawings.

The technical solutions of implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, a future Fifth-Generation (5G) system, or a New Radio (NR) system.

The terminal device in implementations of the present disclosure may be referred to a user equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The terminal device may be a cellular phone, a cordless phone, a Session Initiation Protocol (SIP) phone, a Wireless Local Loop (WLL) station, a Personal Digital Assistant (PDA), a pedestrian device with a wireless communication function, a computing device or another processing device connected to a wireless modem, an on-board device, a wearable device, a terminal device in a future 5G network, or a terminal device in a future evolving Public Land Mobile Network (PLMN), etc., which is not restricted in implementations of present disclosure.

The network device in implementations of the present disclosure may be a device for communicating with the terminal device, the network device may be a Base Transceiver Station (BTS) in a GSMC system or a CDMA system, a NodeB (NB) in a WCDMA system, may be an evolutional NodeB (eNB or eNodeB) in an LTE system, may be a wireless controller in a scenario of a Cloud Radio Access Network (CRAN), or the network device may be a relay station, an access point, an on-board device, or a wearable device, a network device in the future 5G network or a network device in the future evolved Public Land Mobile Network (PLMN), etc., which is not restricted in implementations of the present disclosure.

Figure 1:
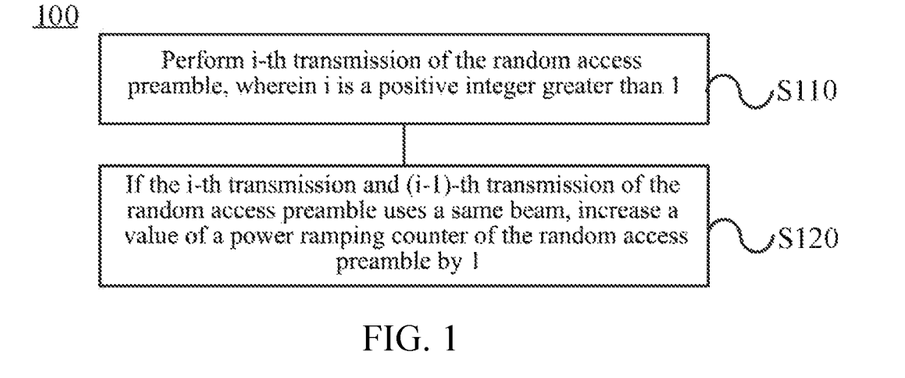
FIG. 1 is a schematic flowchart of a method for transmitting a random access preamble according to an implementation of the present disclosure.

FIG. 1 shows a schematic flowchart of a method 100 for transmitting a random access preamble according to an implementation of the present disclosure. The method 100 may be performed by a terminal device. As shown in FIG. 1, the method 100 includes: in S110, i-th transmission of the random access preamble is performed, where i is a positive integer greater than 1; and in S120, if the i-th transmission and (i−1)-th transmission of the random access preamble use a same beam, a value of a power ramping counter of the random access preamble is increased by 1.

In an implementation of the present disclosure, before the terminal device performs the i-th transmission of the random access preamble (hereinafter referred to as "preamble") in S110, the method 100 further includes: the terminal device determines a transmission resource for performing the preamble. Optionally, the transmission resource for transmitting the preamble may belong to an authorized frequency band, or an unauthorized frequency band. If the transmission resource belongs to the authorized frequency band, that is, the terminal device performs the i-th transmission of the preamble according to a resource configured by a network device. If the transmission resource belongs to the unauthorized frequency band, the terminal device may determine a first preset time-frequency resource in at least one preset time-frequency resource according to a preset condition, wherein the first preset time-frequency resource is used for the i-th transmission of the preamble, wherein the preset condition may be listen before talk (LBT).

Optionally, as an implementation, for performing the i-th transmission of the preamble using the unauthorized frequency band, the terminal device determines at least one preset time-frequency resource which may be used for transmitting the preamble, the at least one preset time-frequency resource belongs to the unauthorized frequency band, and the terminal device determines a first preset time-frequency resource for the i-th transmission of the preamble in the at least one preset time-frequency resource. Specifically, taking a second preset time-frequency resource in the at least one preset time-frequency resource as an example, the terminal device determines whether the second preset time-frequency resource is occupied, and if the second preset time-frequency resource is not occupied, the terminal device determines the second preset time-frequency resource as the first preset time-frequency resource for performing the i-th transmission of the preamble; if the second preset time-frequency resource is occupied, the terminal device continuously determines whether another preset time-frequency resource is occupied or not in the at least one preset time-frequency resource until an unoccupied preset time-frequency resource is found, and the terminal device determines the unoccupied preset time-frequency resource as the first preset time-frequency resource, wherein the another preset time-frequency resource does not include the second preset time-frequency resource.

It should be understood that if the terminal device does not detect an idle preset time-frequency resource in the at least one preset time-frequency resource, that is, the at least one preset time-frequency resource is currently all occupied, the terminal device may consider that the i-th transmission of the preamble fails. Optionally, if the terminal device determines to continue to perform (i+1)-th transmission, it may adopt another resource to perform, or, after a period of time, the terminal device detect again whether there is an unoccupied preset time-frequency resource in the at least one preset time-frequency resource and adopt the unoccupied preset time-frequency resource to perform the (i+1)-th transmission.

It should be understood that whether any one of the at least one preset time-frequency resource is occupied may be determined in various ways. For example, taking the second preset time-frequency resource as an example, whether the second preset time-frequency resource is occupied may be further determined by determining an energy value of a signal in the second preset time-frequency resource. Specifically, the terminal device may detect and determine an energy value of the signal borne by the second preset time-frequency resource, and if the energy value of the signal is less than or equal to a preset energy value, determine that the second preset time-frequency resource is not occupied; if the energy value of the signal is greater than the preset energy value, determine that the second preset time-frequency resource has been occupied. Optionally, the preset energy value may be set according to an actual application, and the implementation of the present disclosure is not limited to this.

In an implementation of the present disclosure, the terminal device determines a transmission resource for transmitting a preamble, and performs i-th transmission of the preamble through the transmission resource. In S120, if a beam used for the i-th transmission of the preamble is the same as a beam used for the (i−1)-th transmission, that is, beams used for the preceding and the following two transmissions of the preamble are the same, a value of a power ramping counter (PREAMBLE_POWER_RAMPING_COUNTER) corresponding to the preamble is increased by 1. Herein, the i-th transmission of the preamble in the implementation of the present disclosure is a non-first transmission, that is, a value of the i is a positive integer greater than 1, and (i−1)-th transmission of the preamble exists before the i-th transmission.

Optionally, the terminal device may determine whether the i-th transmission is a non-first transmission through a counter of transmission times of a preamble (PREAMBLE_TRANSMISSION_COUNTER) corresponding to the preamble. An initial value of the PREAMBLE_TRANSMISSION_COUNTER is set to 1, and then the value of the PREAMBLE_TRANSMISSION_COUNTER is increased by 1 every time transmission of the preamble fails. Therefore, when the value of the PREAMBLE_TRANSMISSION_COUNTER is greater than 1, it represents that the i-th transmission is a non-first transmission.

It should be understood that the terminal device determines that the beam used for the i-th transmission of the preamble is the same as the beam used for the (i−1)-th transmission, may include: if the i-th transmission and the (i−1)-th transmission of the preamble use a same synchronous signal block (SS block), that is, the SS block does not change, it may be determined that the beam used for the i-th transmission of the preamble is the same as the beam used for the (i−1)-th transmission, that is, a transmitting beam adopted by the terminal device to send the preamble in the i-th transmission is the same as a transmitting beam adopted by the terminal device to send the preamble in the (i−1)-th transmission, and beam switching does not occur, then the terminal device may increase the value of the corresponding PREAMBLE_POWER_RAMPING_COUNTER by 1 after the i-th transmission of the preamble.

Correspondingly, if the beam used for the i-th transmission of the preamble is different from the beam used for the (i−1)-th transmission, that is, a transmitting beam adopted by the terminal device to send the preamble in the i-th transmission is different from a transmitting beam adopted by the terminal device to send the preamble in the (i−1)-th transmission, the value of the corresponding PREAMBLE_POWER_RAMPING_COUNTER remains unchanged after the i-th transmission of the preamble.

In the implementation of the present disclosure, in S120, determining, by the terminal device, that the beam used for the i-th transmission of the preamble is the same as the beam used for the (i−1)-th transmission, and increasing the value of the corresponding PREAMBLE POWER_RAMPING_COUNTER by 1, may further includes: if the terminal device determines that the beam used for the i-th transmission of the preamble is the same as the beam used for the (i−1)-th transmission, and the terminal device determines that there is no need to suspend the PREAMBLE_POWER_RAMPING_COUNTER, increasing the value of the PREAMBLE_POWER_RAMPING_COUNTER by 1, otherwise the value of the PREAMBLE_POWER_RAMPING_COUNTER remains unchanged. Specifically, a MAC entity of the terminal device may suspend the PREAMBLE_POWER_RAMPING_COUNTER according to an indication of a lower layer, so that the PREAMBLE_POWER_RAMPING_COUNTER remains unchanged; if the terminal device does not receive the indication after the i-th transmission of the preamble, or receives an indication which is not to suspend the PREAMBLE_POWER_RAMPING_COUNTER, the terminal device increases the value of the corresponding PREAMBLE_POWER_RAMPING_COUNTER by 1 after the i-th transmission of the preamble, when the beam used for the i-th transmission of the preamble is the same as the beam used for the (i−1)-th transmission.

In an implementation of the present disclosure, the value of the PREAMBLE_POWER_RAMPING_COUNTER may be used for determining a transmission power of sending, by the terminal device, the preamble. Specifically, after performing the i-th transmission of the preamble, if the i-th transmission fails, the terminal device may determine whether to perform the (i+1)-th transmission of the preamble, and if so, a power of sending, by the terminal device, the preamble during the (i+1)-th transmission may be determined according to the value of the corresponding PREAMBLE_POWER_RAMPING_COUNTER determined after performing the (i+1)-th transmission of the preamble.

Optionally, during the (i+1)-th transmission, the power PREAMBLE_RECEIVED_TARGET_POWER of sending, by the terminal device, the preamble may be determined by a following formula:

PREAMBLE_RECEIVED_TARGET_POWER=
    ra-Preamble Initial Received Target Power+
    DELTA_PREAMBLE+(PREAMBLE_POWER_
    RAMPING_COUNTER−1)*power Ramping
    Step Herein, the ra-Preamble Initial Received Target Power, the DELTA_PREAMBLE, and a power Ramping Step are all preconfigured parameters, and the PREAMBLE_POWER_RAMPING_COUNTER represents a value of the corresponding PREAMBLE_POWER_RAMPING_COUNTER determined by the terminal device after performing the (i+1)-th transmission of the preamble.

In an implementation of the present disclosure, after the terminal device performs the i-th transmission of the preamble, the terminal device may determine whether the i-th transmission fails according to whether the terminal device successfully receives a random access response (RAR) and according to whether contention is successful. Specifically, when the terminal device performs the i-th transmission of the preamble, the terminal device sends the preamble, i.e. msg1, to a network device, wherein the preamble may be determined by random selection, and the network device sends the RAR, i.e. msg2, to the terminal device according to the received preamble. If the terminal device fails to receive the RAR within an RAR window, the terminal device determines that the i-th transmission of the preamble fails. For example, the failure of the terminal device to send the preamble to the network device, or the failure of the network device to send the RAR to the terminal device, etc., will cause the terminal device to fail to receive the RAR within the RAR window.

For another example, for the i-th transmission of the preamble adopting an unauthorized transmission resource, if the network device has not been able to determine a resource which may be used for transmitting the msg2, for example, the network device has performed LBT multiple times, detected transmission resources all have been occupied, it may also cause the terminal device to fail to receive the msg2 within the RAR window, thus causing the terminal device to determine that the i-th transmission of the preamble fails.

It should be understood that a duration of the RAR window may be set according to an actual application, and the implementation of the present disclosure is not limited to this.

Optionally, if the contention of the terminal device fails, the i-th transmission of the preamble of the terminal device fails. Specifically, when the terminal device receives the msg2 sent by the network device, it sends msg3 to the network device, and sends an RRC Connection Request through the msg3, wherein the msg3 includes an identification of the terminal device, and the network device sends msg4 to the terminal device according to the msg3, wherein the msg4 also includes the identification of the terminal device. When there are multiple terminal devices simultaneously sending a same preamble to a network device, the network device receives msg3 sent by the multiple terminal devices, wherein each msg3 includes an identification of a corresponding terminal device, and the network device determines one terminal device among the multiple terminal devices, and sends msg4 to the one terminal device, wherein the msg4 includes the identification of the one terminal device, so that the multiple terminal devices determine whether contention is successful or not according to the received msg4. If a terminal device determines its own identification information in the msg4, contention is successful, if the terminal device does not determine its own identification in the msg4, the contention of the terminal device fails.

In an implementation of the present disclosure, if the terminal device fails to perform the i-th transmission of the preamble, the terminal device may determine whether to perform (i+1)-th transmission of the preamble according to the value of the PREAMBLE_TRANSMISSION_COUNTER corresponding to the preamble. Specifically, the terminal device may record the transmission times of the preamble through the PREAMBLE_TRANSMISSION_COUNTER, and determine that the random access process fails when the value of the PREAMBLE_TRANSMISSION_COUNTER reaches the maximum value of the transmission times.

Specifically, when the terminal device fails to perform the i-th transmission of the preamble, the value of the PREAMBLE_TRANSMISSION_COUNTER corresponding to the preamble is increased by 1, and at this time, if the value of the corresponding PREAMBLE_TRANSMISSION_COUNTER is less than or equal to the maximum value of the transmission times, the terminal device continues to perform the (i+1)-th transmission of the preamble; if the value of the corresponding PREAMBLE_TRANSMISSION_COUNTER is greater than the maximum value of the transmission times, the terminal device determines that the random access process fails.

In an implementation of the present disclosure, after the random access process of the terminal device fails, the terminal device may determine whether a cell in which the transmission of the preamble is located is a primary cell, if the cell is the primary cell, the terminal device sends an RRC signaling to a network device corresponding to the primary cell, wherein the RRC signaling is used for indicating a radio link failure; and if the cell is not the primary cell but a secondary cell, the RRC signaling needs not to be sent. Optionally, the primary cell may include a primary cell of a primary base station connected to the terminal device or a primary cell of a secondary base station connected to the terminal device; the secondary cell may include a secondary cell of a primary base station connected to the terminal device or a secondary cell of a secondary base station connected to the terminal device, and the implementation of the present disclosure is not limited thereto.

In an implementation of the present disclosure, the maximum value of the transmission times of the preamble may be set according to an actual application, for example, it may be set to a fixed value, or the maximum value of the transmission times may be determined according to a configuration of a network device. Optionally, the terminal device may set the maximum value of the transmission times according to whether a frequency band in which the resource of transmitting the preamble is located is an authorized frequency band.

Specifically, if the resource for transmitting the preamble belongs to the authorized frequency band, the terminal device sets the maximum value of the transmission times of preamble to a first value; and if the resource for transmitting the preamble belongs to a unauthorized frequency band, the terminal device sets the maximum value of the transmission times of the preamble to a second value, wherein the first value is different from the second value.

Optionally, considering that for the unauthorized frequency band, the terminal device needs to perform LBT on a corresponding preset time-frequency resource, to determine an unoccupied resource to perform transmission of the preamble; correspondingly, the network device also needs to perform LBT on a corresponding preset time-frequency resource, to determine an unoccupied resource to perform transmission of an RAR corresponding to the preamble. Therefore, this will increase a probability that the terminal device cannot receive an RAR within an RAR window. However, the terminal device may set the maximum value of the transmission times of the preamble according to whether the resource of transmitting the preamble belongs to the unauthorized frequency band, and set the second value corresponding to the unauthorized frequency band to be greater than the first value corresponding to the authorized frequency band, so as to reduce a probability of determining, by the terminal device, a random access process fails due to an LBT failure.

Optionally, the terminal device determines the first value and the second value, including: the terminal device receives configuration information sent by the network device, wherein the configuration information includes the first value and/or the second value, but the implementation of the present disclosure is not limited to this.

Therefore, in the method for transmitting a random access preamble in the implementation of the present disclosure, the terminal device includes PREAMBLE_POWER_RAMPING_COUNTER for recording power ramping, and if a non-first transmission of a preamble performed by the terminal device uses a same beam as a previous transmission, that is, the beam does not change, a value of the PREAMBLE_POWER_RAMPING_COUNTER corresponding to the preamble is increased by 1; if the beam changes, the value of the PREAMBLE_POWER_RAMPING_COUNTER remains unchanged, i.e. the PREAMBLE_POWER_RAMPING_COUNTER of the terminal device supports ensuring that power ramping remains unchanged when beam switching occurs in a preamble transmission process.

Figure 2:
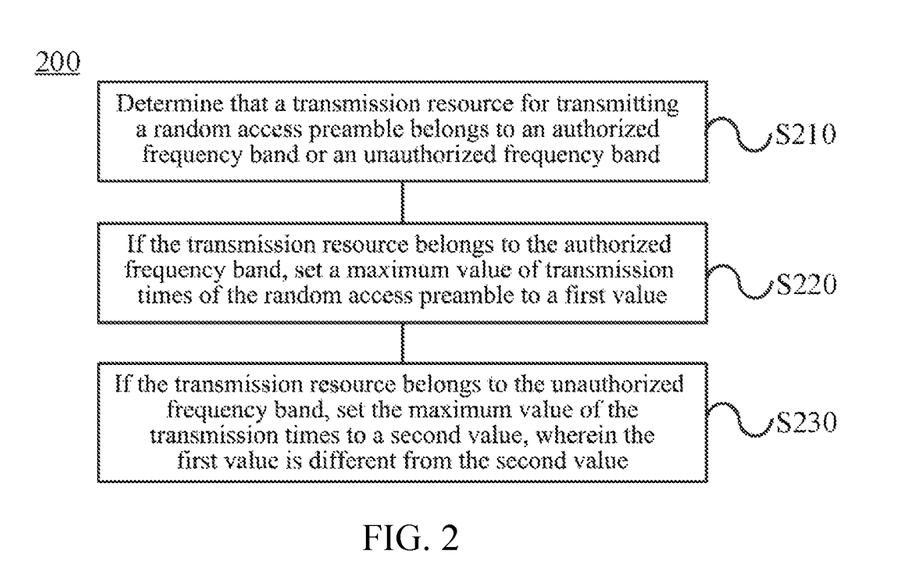
FIG. 2 is a schematic flowchart of a method for transmitting a random access preamble according to another implementation of the present disclosure.

FIG. 2 shows a schematic flowchart of a method 200 for transmitting a random access preamble according to another implementation of the present disclosure. The method 200 may be performed by a terminal device. As shown in FIG. 2, the method 200 includes: in S210, that a transmission resource for transmitting a random access preamble belongs to an authorized frequency band or an unauthorized frequency band is determined; in S220, if the transmission resource belongs to the authorized frequency band, setting a maximum value of transmission times of the random access preamble to a first value; and in S230, if the transmission resource belongs to the unauthorized frequency band, setting the maximum value of the transmission times to a second value, wherein the first value is different from the second value.

In the implementation of the present disclosure, considering that for when the terminal device uses a resource of the unauthorized frequency band, the terminal device needs to perform LBT on a corresponding transmission resource, to determine an unoccupied resource to perform transmission of the preamble; correspondingly, a network device also needs to perform LBT on a corresponding transmission resource, to determine an unoccupied resource to perform transmission of an RAR corresponding to the preamble. Therefore, the LBT of the terminal device and the network device will increase a transmission duration, and then increase a probability that the terminal device cannot receive an RAR within an RAR window.

Therefore, in the method for transmitting a random access preamble according to the implementation of the present disclosure, the terminal device may set a maximum value of transmission times of a preamble according to whether a resource of transmitting the preamble belongs to an unauthorized frequency band, and if the resource of transmitting the preamble belongs to an authorized resource, set the maximum value of the transmission times to a first value correspondingly; if the resource of transmitting the preamble belongs to the unauthorized frequency band, set the maximum value of the transmission times to a second value correspondingly, and the first value is different from the second value, for example, set the second value to be greater than the first value, so as to reduce a probability of determining, by the terminal device, a random access process fails due to an LBT failure.

In an implementation of the present disclosure, the terminal device includes a counter of transmission times (PREAMBLE_TRANSMISSION_COUNTER) for recording transmission times of a preamble. Specifically, the terminal device sets an initial value of the PREAMBLE_TRANSMISSION_COUNTER to 1, and then when the terminal device fails to perform the i-th transmission of the preamble, the value of the PREAMBLE_TRANSMISSION_COUNTER is increased by 1, where i is a positive integer.

In an implementation of the present disclosure, if the terminal device fails to perform the i-th transmission of the preamble, it may determine whether to perform the (i+1)-th transmission of the preamble according to the value of the PREAMBLE_TRANSMISSION_COUNTER corresponding to the preamble. Specifically, the terminal device may record the transmission times of the preamble through the PREAMBLE_TRANSMISSION_COUNTER, and determine that the random access process fails when the value of the PREAMBLE_TRANSMISSION_COUNTER reaches the maximum value of the transmission times, wherein the maximum value of the transmission times may be the first value or the second value.

Specifically, when the terminal device fails to perform the i-th transmission of the preamble, the value of the PREAMBLE_TRANSMISSION_COUNTER corresponding to the preamble is increased by 1, and at this time, if the value of the corresponding PREAMBLE_TRANSMISSION_COUNTER is less than or equal to the maximum value of the transmission times, the terminal device continues to perform the (i+1)-th transmission of the preamble; if the value of the corresponding PREAMBLE_TRANSMISSION_COUNTER is greater than the maximum value of the transmission times, the terminal device determines that the random access process fails.

In an implementation of the present disclosure, the terminal device may determine that the maximum value of the transmission times of the preamble is the first value or the second value, according to whether the preamble of transmission belongs to the unauthorized frequency band. Specifically, the first value and the second value may be set according to an actual application, or the terminal device may receive configuration information sent by the network device, wherein the configuration information includes the first value and/or the second value, then the terminal device determines the first value and the second value according to the configuration information, and the implementation of the present disclosure is not limited thereto.

It should be understood that before the terminal device performs the i-th transmission of the preamble, the method 200 further includes: a resource for performing the i-th transmission is determined among transmission resources for transmitting the preamble. Specifically, for an authorized resource, the terminal device adopts the authorized resource to perform the i-th transmission of the preamble.

Optionally, for an unauthorized transmission resource, the terminal device determines a resource which may be used for performing the i-th transmission of the preamble through LBT in the unauthorized transmission resource. Specifically, the terminal device determines whether a first resource is occupied in the unauthorized transmission resource, and if the first resource is not occupied, the terminal device uses the first resource to perform the i-th transmission of the preamble; if the first resource is occupied, the terminal device continues to determine whether another resource other than the first resource is occupied or not in the unauthorized resource until an unoccupied resource is determined, and uses the unoccupied resource to perform the i-th transmission of the preamble.

It should be understood that if the terminal device does not detect an idle resource in entire unauthorized transmission resources, that is, the entire unauthorized transmission resources are all currently occupied, the terminal device may determine that the i-th transmission of the preamble fails. Optionally, if the terminal device determines to continue to perform the (i+1)-th transmission, it may adopt another resource to perform, or, after a period of time, the terminal device may detect again whether there is an unoccupied time-frequency resource in the unauthorized transmission resources, and adopt the unoccupied time-frequency resource to perform the (i+1)-th transmission.

It should be understood that whether any time-frequency resource of the unauthorized transmission resources is occupied may be determined in various ways. For example, taking a first resource as an example, whether the first resource is occupied may be further determined by determining an energy value of a signal in the first resource. Specifically, the terminal device may detect and determine an energy value of the signal borne by the first resource, and if the energy value of the signal is less than or equal to a preset energy value, determine that the first resource is not occupied; if the energy value of the signal is greater than the preset energy value, determine that the first resource has been occupied. Optionally, the preset energy value may be set according to an actual application, and the implementation of the present disclosure is not limited to this.

In an implementation of the present disclosure, after the terminal device performs the i-th transmission of the preamble, the terminal device may also determine whether the i-th transmission fails according to whether the terminal device successfully receives an RAR and according to whether contention is successful. Specifically, when the terminal device performs the i-th transmission of the preamble, it sends the preamble, i.e. msg1, to a network device, wherein the preamble may be determined by random selection, and the network device sends the RAR, i.e. msg2, to the terminal device according to the received preamble. If the terminal device fails to successfully receive the RAR within an RAR window, the terminal device determines that the i-th transmission of the preamble fails. For example, the failure of the terminal device to send the preamble to the network device, or the failure of the network device to send the RAR to the terminal device, etc., will all cause the terminal device to fail to receive the RAR within the RAR window.

For another example, for the i-th transmission of the preamble adopting an unauthorized transmission resource, if the network device has not been able to determine the resource which may be used for transmitting the msg2, for example, the network device has performed LBT multiple times, detected transmission resources all have been occupied, it may also cause the terminal device fail to receive the msg2 within the RAR window, thus causing the terminal device to determine that the i-th transmission of the preamble fails.

It should be understood that a duration of the RAR window may be set according to an actual application, and the implementation of the present disclosure is not limited to this.

Optionally, for that the contention of the terminal device fails, the terminal device may also determine that the i-th transmission of the preamble fails. Specifically, when the terminal device receives the msg2 sent by the network device, it sends msg3 to the network device, and sends an RRC Connection Request through the msg3, wherein the msg3 includes an identification of the terminal device, and the network device sends msg4 to the terminal device according to the msg3, wherein the msg4 also includes the identification of the terminal device. When there are multiple terminal devices simultaneously sending a same preamble to a network device, the network device receives msg3 sent by the multiple terminal devices, wherein each msg3 includes an identification of a corresponding terminal device, and the network device determines one terminal device among the multiple terminal devices, and sends msg4 to the terminal device, wherein the msg4 includes the identification of the terminal device, so that the multiple terminal devices determine whether contention is successful or not according to the received msg4. If the terminal device determines its own identification information in the msg4, the contention is successful. If the terminal device does not determine its own identification in the msg4, the contention of the terminal device fails.

To sum up, for performing transmission of the preamble using the unauthorized transmission resource, the terminal device determines that a probability of transmission failure of the preamble is greater than a probability of transmitting the preamble with an authorized resource. Therefore, when transmitting the preamble using the unauthorized transmission resource, the terminal device may set a corresponding maximum value of transmission times of the preamble to a larger second value, while when transmitting the preamble using the authorized transmission resource, the terminal device may set a corresponding maximum value of transmission times of the preamble to a smaller first value.

In an implementation of the present disclosure, after the terminal device determines the random access process fails according to the value of the PREAMBLE_TRANSMISSION_COUNTER, the terminal device may determine whether a cell in which the transmission of the preamble is located is a primary cell, if the cell is the primary cell, the terminal device sends an RRC signaling to the network device corresponding to the primary cell, wherein the RRC signaling is used for indicating a radio link failure; and if the cell is not the primary cell but a secondary cell, the RRC signaling needs not to be sent. Optionally, the primary cell may include a primary cell of a primary base station connected to the terminal device or a primary cell of a secondary base station connected to the terminal device; the secondary cell may include a secondary cell of a primary base station connected to the terminal device or a secondary cell of a secondary base station connected to the terminal device, and the implementation of the present disclosure is not limited thereto.

Therefore, in the method for transmitting a random access preamble according to the implementation of the present disclosure, the terminal device may set a maximum value of transmission times of a preamble according to whether a resource of transmitting the preamble belongs to an unauthorized frequency band, and if the resource of transmitting the preamble belongs to an authorized resource, set the maximum value of the transmission times to a first value correspondingly; if the resource of transmitting the preamble belongs to the unauthorized frequency band, set the maximum value of the transmission times to a second value correspondingly, and the first value is different from the second value, for example, set the second value to be greater than the first value, so as to reduce a probability of determining, by the terminal device, a random access process fails due to an LBT failure.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

The term "and/or" in this document is merely used to describe an association relationship between associated objects, indicating that there may be three relationships, for example, a and/or b may indicate three situations: A alone, A and B, and B alone. In addition, the symbol "/" in this document generally indicates that objects before and after the symbol "/" have an "or" relationship.

The methods for transmitting a random access preamble according to the implementations of the present disclosure are described in detail above with reference to FIG. 1 to FIG. 2. A terminal device according to implementations of the present disclosure will be described below with reference to FIG. 3 to FIG. 6.

Figure 3:
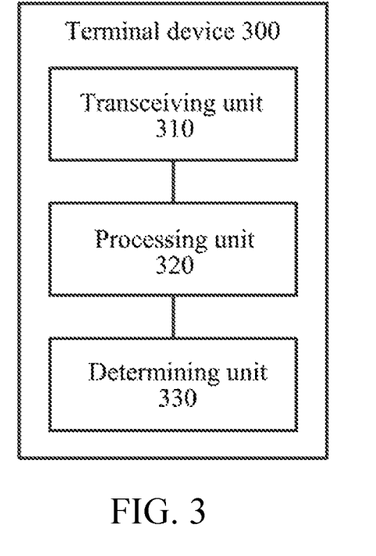
FIG. 3 is a schematic block diagram of a terminal device according to an implementation of the present disclosure.

As shown in FIG. 3, a terminal device 300 according to an implementation of the present disclosure includes a transceiving unit 310 and a processing unit 320, and optionally, further includes a determining unit 330.

Specifically, the transceiving unit 310 is configured to: perform i-th transmission of the random access preamble, where i is a positive integer greater than 1; and the processing unit 320 is configured to increase a value of a power ramping counter of the random access preamble by 1, if the i-th transmission and (i–1)-th transmission of the random access preamble use a same beam.

Therefore, the terminal device according to the implementation of the present disclosure includes PREAMBLE_POWER_RAMPING_COUNTER for recording power ramping, and if a non-first transmission of a preamble performed by the terminal device uses a same beam as a previous transmission, that is, the beam does not change, the terminal device increases a value of PREAMBLE_POWER_RAMPING_COUNTER corresponding to the preamble by 1; if the beam changes, the value of the PREAMBLE_POWER_RAMPING_COUNTER remains unchanged, i.e. the PREAMBLE_POWER_RAMPING_COUNTER of the terminal device supports ensuring that power ramping remains unchanged when beam switching occurs in a preamble transmission process.

Optionally, the determining unit 330 is configured to determine that there is no need to suspend the power ramping counter before the processing unit 320 increases the value of the power ramping counter of the random access preamble by 1.

Optionally, the determining unit 330 is configured to determine that the i-th transmission and (i–1)-th transmission of the random access preamble use a same beam, if the i-th transmission and the (i–1)-th transmission of the random access preamble use a same synchronization signal block.

Optionally, the determining unit 330 is configured to determine a first preset time-frequency resource in at least one preset time-frequency resource, before the transceiving unit 310 performs the i-th transmission of the random access preamble, wherein the first preset time-frequency resource is used for the i-th transmission of the random access preamble.

Optionally, the determining unit 330 is specifically configured to determine whether a second preset time-frequency resource in the at least one preset time-frequency resource is occupied; if the second preset time-frequency resource is not occupied, determine the second preset time-frequency resource as the first preset time-frequency resource; or, if the second preset time-frequency resource is occupied, determine whether another preset time-frequency resource other than the second preset time-frequency resource in the at least one preset time-frequency resource is occupied.

Optionally, the determining unit 330 is specifically configured to determine an energy value of a signal borne by the second preset time-frequency resource; if the energy value of the signal is less than or equal to a preset energy value, determine that the second preset time-frequency resource is not occupied; or if the energy value of the signal is greater than a preset energy value, determine that the second preset time-frequency resource is not occupied.

Optionally, the value of the power ramping counter after the i-th transmission of the random access preamble is used for determining a (i+1)-th transmission power of the random access preamble.

Optionally, the processing unit 320 is specifically configured to: after the transceiving unit 310 performs the i-th transmission of the random access preamble, if the processing unit 320 determines that the i-th transmission of the random access preamble fails, increase a value of a counter of transmission times of the random access preamble by 1, wherein the counter of the transmission times is used for recording the transmission times of the random access preamble.

Optionally, the transceiving unit 310 is specifically configured to: after the processing unit 320 increases the value of the counter of the transmission times of the random access preamble by 1, if the value of the counter of the transmission times is less than or equal to a maximum value of the transmission times of the random access preamble, perform the (i+1)-th transmission of the random access preamble; or, if the value of the counter of the transmission times is greater than the maximum value of the transmission times, determine that a random access process fails.

Optionally, the determining unit 330 is configured to determine that a receiving cell of the random access preamble is a primary cell after the determining unit 330 determines that the random access process fails; and the transceiving unit 310 is specifically configured to send an RRC signaling to the network device corresponding to the primary cell, wherein the RRC signaling is used for indicating a radio link failure.

Optionally, the determining unit 330 is configured to determine that a transmission resource for transmitting the random access preamble belongs to an authorized frequency band or an unauthorized frequency band; and the processing unit 320 is specifically configured to set a maximum value of transmission times of the random access preamble to a first value, if the transmission resource belongs to the authorized frequency band; or, set the maximum value of the transmission times to a second value, if the transmission resource belongs to the unauthorized frequency band, wherein the first value is different from the second value.

Optionally, the first value is less than the second value.

Optionally, the transceiving unit 310 is specifically configured to receive configuration information sent by the network device, wherein the configuration information includes the first value and/or the second value.

It should be understood that the terminal device 300 according to the implementation of the present disclosure may correspondingly perform the method 100 in the implementation of the present disclosure, and the above and other operations and/or functions of each unit in the terminal device 300 are respectively for realizing corresponding flow of the terminal device of the method in FIG. 1, and will not be repeated here for the sake of brevity.

Therefore, the terminal device according to the implementation of the present disclosure includes PREAMBLE_POWER_RAMPING_COUNTER for recording power ramping, and if a non-first transmission of a preamble performed by the terminal device uses a same beam as a previous transmission, that is, the beam does not change, the terminal device increases a value of PREAMBLE_POWER_RAMPING_COUNTER corresponding to the preamble by 1; if the beam changes, the value of the PREAMBLE_POWER_RAMPING_COUNTER remains unchanged, i.e. the PREAMBLE_POWER_RAMPING_COUNTER of the terminal device supports ensuring that power ramping remains unchanged when beam switching occurs in a preamble transmission process.

Figure 4:
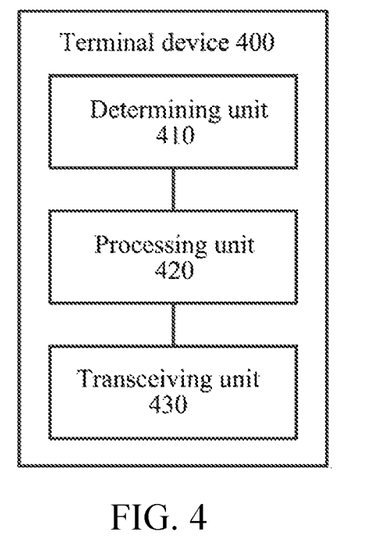
FIG. 4 is a schematic block diagram of a terminal device according to another implementation of the present disclosure.

As shown in FIG. 4, a terminal device 400 according to an implementation of the present disclosure includes a determining unit 410 and a processing unit 420, and optionally, further includes a transceiving unit 430.

Specifically, the determining unit 410 is configured to determine that a transmission resource for transmitting a random access preamble belongs to an authorized frequency band or an unauthorized frequency band; and the processing unit 420 is configured to set a maximum value of transmission times of the random access preamble to a first value, if the transmission resource belongs to the authorized frequency band; and the processing unit 420 is further configured to set the maximum value of the transmission times to a second value, if the transmission resource belongs to the unauthorized frequency band, wherein the first value is different from the second value.

Therefore, the terminal device according to the implementation of the present disclosure, sets a maximum value of transmission times of a preamble according to whether a resource of transmitting the preamble belongs to an unauthorized frequency band, and if the resource of transmitting the preamble belongs to an authorized resource, the terminal device sets the maximum value of the transmission times to a first value correspondingly; if the resource of transmitting the preamble belongs to the unauthorized frequency band, the terminal device sets the maximum value of the transmission times to a second value correspondingly, and the first value is different from the second value, for example, the terminal device sets the second value to be greater than the first value, so as to reduce a probability of determining, by the terminal device, a random access process fails due to an LBT failure.

Optionally, the first value is less than the second value.

Optionally, the transceiving unit 430 is configured to receive configuration information sent by the network device, wherein the configuration information includes the first value and/or the second value.

Optionally, the processing unit 420 is specifically configured to increase a value of a counter of transmission times of the random access preamble by 1, if the i-th transmission of the random access preamble fails, wherein the counter of the transmission times is used for recording the transmission times of the random access preamble, where i is a positive integer.

Optionally, the processing unit 420 is specifically configured to: after the value of the counter of the transmission times of the random access preamble is increased by 1, if the value of the counter of the transmission times is less than or equal to the maximum value of the transmission times, perform the (i+1)-th transmission of the random access preamble; or, if the value of the counter of the transmission times is greater than the maximum value of the transmission times, determine that a random access process fails.

Optionally, the determining unit 410 is specifically configured to determine that a receiving cell of the random access preamble is a primary cell, after determining that the random access process fails; and the transceiving unit 430 is configured to send an RRC signaling to the network device corresponding to the primary cell, wherein the RRC signaling is used for indicating a radio link failure.

Optionally, the determining unit 410 is specifically configured to determine whether a first resource in the transmission resource is occupied; if the first resource is occupied, determine whether another resource other than the first resource in the transmission resource is occupied; or, if the first resource is not occupied, use the first resource to perform the i-th transmission of the random access preamble.

Optionally, the determining unit 410 is specifically configured to: after determining whether the another resource other than the first resource in the transmission resource is occupied if the first resource is occupied, if there is no unoccupied resource in the transmission resource, determine that the i-th transmission of the random access preamble fails.

It should be understood that the terminal device 400 according to the implementation of the present disclosure may correspondingly perform the method 200 in the implementation of the present disclosure, and the above and other operations and/or functions of each unit in the terminal device 400 are respectively for realizing corresponding flow of the terminal device of the method in FIG. 2, and will not be repeated here for the sake of brevity.

Optionally, the terminal device 400 may be the terminal device 300 according to the implementation of the present disclosure, but the implementation of the present disclosure is not limited to this.

Therefore, the terminal device according to the implementation of the present disclosure, sets a maximum value of transmission times of a preamble according to whether a resource of transmitting the preamble belongs to an unauthorized frequency band, and if the resource of transmitting the preamble belongs to an authorized resource, the terminal device sets the maximum value of the transmission times to a first value correspondingly; if the resource of transmitting the preamble belongs to the unauthorized frequency band, the terminal device sets the maximum value of the transmission times to a second value correspondingly, and the first value is different from the second value, for example, the terminal device sets the second value to be greater than the first value, so as to reduce a probability of determining, by the terminal device, a random access process fails due to an LBT failure.

Figure 5:
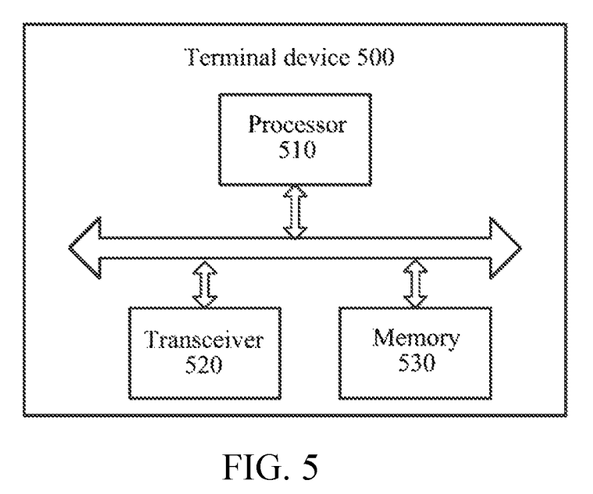
FIG. 5 is a schematic block diagram of a terminal device according to yet another implementation of the present disclosure.

FIG. 5 shows a schematic block diagram of a terminal device 500 according to an implementation of the present disclosure. As shown in FIG. 5, the terminal device 500 includes a processor 510 and a transceiver 520, wherein the processor 510 is connected to the transceiver 520, and optionally, the terminal device 500 further includes a memory 530, wherein the memory 530 is connected to the processor 510. Herein, the processor 510, the memory 530 and the transceiver 520 communicate with each other through an internal connection path to transfer and/or control data signals. The memory 530 may be configured to store instructions. The processor 510 is configured to execute the instructions stored in the memory 530 to control the transceiver 520 to send information or signals. The transceiver 520 is configured to execute i-th transmission of the random access preamble, where i is a positive integer greater than 1; and the processor 510 is configured to increase a value of a power ramping counter of the random access preamble by 1, if the i-th transmission and (i−1)-th transmission of the random access preamble use a same beam.

Therefore, the terminal device according to the implementation of the present disclosure includes PREAMBLE_POWER_RAMPING_COUNTER for recording power ramping, and if a non-first transmission of a preamble performed by the terminal device uses a same beam as a previous transmission, that is, the beam does not change, the terminal device increases a value of PREAMBLE_POWER_RAMPING_COUNTER corresponding to the preamble by 1; if the beam change s, the value of the PREAMBLE_POWER_RAMPING_COUNTER remains unchanged, i.e. the PREAMBLE_POWER_RAMPING_COUNTER of the terminal device supports ensuring that power ramping remains unchanged when beam switching occurs in a preamble transmission process.

Optionally, as an implementation, the processor 510 is configured to determine that there is no need to suspend the power ramping counter before the value of the power ramping counter of the random access preamble is increased by 1.

Optionally, as an implementation, the processor 510 is configured to determine that the i-th transmission and (i−1)-th transmission of the random access preamble use a same beam, if the i-th transmission and the (i−1)-th transmission of the random access preamble use a same synchronization signal block.

Optionally, as an implementation, the processor 510 is configured to determine a first preset time-frequency resource in at least one preset time-frequency resource, before the transceiver 520 executes the i-th transmission of the random access preamble, wherein the first preset time-frequency resource is used for the i-th transmission of the random access preamble.

Optionally, as an implementation, the processor 510 is configured to determine whether a second preset time-frequency resource in the at least one preset time-frequency resource is occupied; if the second preset time-frequency resource is not occupied, determine the second preset time-frequency resource as the first preset time-frequency resource; or, if the second preset time-frequency resource is occupied, determine whether another preset time-frequency resource other than the second preset time-frequency resource in the at least one preset time-frequency resource is occupied.

Optionally, as an implementation, the processor 510 is configured to determine an energy value of a signal borne by the second preset time-frequency resource; if the energy value of the signal is less than or equal to a preset energy value, determine that the second preset time-frequency resource is not occupied; or if the energy value of the signal is greater than a preset energy value, determine that the second preset time-frequency resource is not occupied.

Optionally, as an implementation, the value of the power ramping counter after the i-th transmission of the random access preamble is used for determining a (i+1)-th transmission power of the random access preamble.

Optionally, as an implementation, the processor 510 is configured to: after the transceiver 520 executes the i-th transmission of the random access preamble, if determining that the i-th transmission of the random access preamble fails, increase a value of a counter of transmission times of the random access preamble by 1, wherein the counter of the transmission times is used for recording the transmission times of the random access preamble.

Optionally, as an implementation, the transceiver 520 is specifically configured to: after the processor 510 increases the value of the counter of the transmission times of the random access preamble by 1, if the value of the counter of the transmission times is less than or equal to a maximum value of the transmission times of the random access preamble, perform the (i+1)-th transmission of the random access preamble; or, if the value of the counter of the transmission times is greater than the maximum value of the transmission times, determine that a random access process fails.

Optionally, as an implementation, the processor 510 is configured to determine that a receiving cell of the random access preamble is a primary cell, after determining that the random access process fails; and the transceiver 520 is configured to send an RRC signaling to the network device corresponding to the primary cell, wherein the RRC signaling is used for indicating a radio link failure.

Optionally, as an implementation, the processor 510 is configured to determine that a transmission resource for transmitting the random access preamble belongs to an authorized frequency band or an unauthorized frequency band; and set a maximum value of transmission times of the random access preamble to a first value, if the transmission resource belongs to the authorized frequency band; or, set the maximum value of the transmission times to a second value, if the transmission resource belongs to the unauthorized frequency band, wherein the first value is different from the second value.

Optionally, as an implementation, the first value is less than the second value.

Optionally, as an implementation, the transceiver 520 is specifically configured to receive configuration information sent by the network device, wherein the configuration information includes the first value and/or the second value.

It should be understood that the terminal device 500 according to the implementation of the present disclosure may correspond to the terminal device 300 in the implementation of the present disclosure and may correspond to a relevant subject that performs the method 100 according to the implementation of the present disclosure, and the above and other operations and/or functions of each unit in the terminal device 500 are respectively for realizing each corresponding flow of the terminal device in the method shown in FIG. 1, and will not be repeated here for the sake of brevity.

Therefore, the terminal device according to the implementation of the present disclosure includes PREAMBLE_POWER_RAMPING_COUNTER for recording power ramping, and if a non-first transmission of a preamble performed by the terminal device uses a same beam as a previous transmission, that is, the beam does not change, the terminal device increases a value of PREAMBLE_POWER_RAMPING_COUNTER corresponding to the preamble by 1; if the beam change s, the value of the PREAMBLE_POWER_RAMPING_COUNTER remains unchanged, i.e. the PREAMBLE_POWER_RAMPING_COUNTER of the terminal device supports ensuring that power ramping remains unchanged when beam switching occurs in a preamble transmission process.

Figure 6:
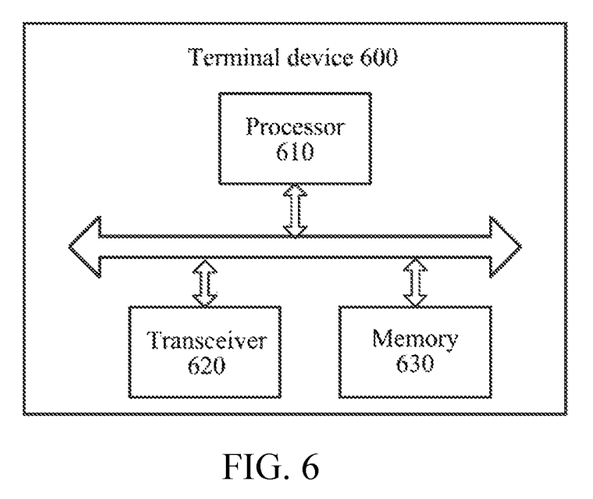
FIG. 6 is a schematic block diagram of a terminal device according to yet another implementation of the present disclosure.

FIG. 6 shows a schematic block diagram of a terminal device 600 according to an implementation of the present disclosure. As shown in FIG. 6, the terminal device 600 includes a processor 610 and a transceiver 620, wherein the processor 610 is connected to the transceiver 620, and optionally, the terminal device 600 further includes a memory 630, wherein the memory 630 is connected to the processor 610. Herein, the processor 610, the memory 630, and the transceiver 620 communicate with each other through an internal connection path to transfer and/or control data signals. The memory 630 may be configured to store instructions. The processor 610 is configured to execute the instructions stored in the memory 630 to control the transceiver 620 to send information or signals. The processor 610 is configured to determine a transmission resource for transmitting a random access preamble belongs to an authorized frequency band or an unauthorized frequency band; set a maximum value of transmission times of the random access preamble to a first value, if the transmission resource belongs to the authorized frequency band; set the maximum value of the transmission times to a second value, if the transmission resource belongs to the unauthorized frequency band, wherein the first value is different from the second value.

Therefore, the terminal device according to the implementation of the present disclosure, sets a maximum value of transmission times of a preamble according to whether a resource of transmitting the preamble belongs to an unauthorized frequency band, and if the resource of transmitting the preamble belongs to an authorized resource, the terminal device sets the maximum value of the transmission times to a first value correspondingly; if the resource of transmitting the preamble belongs to the unauthorized frequency band, the terminal device sets the maximum value of the transmission times to a second value correspondingly, and the first value is different from the second value, for example, the terminal device sets the second value to be greater than the first value, so as to reduce a probability of determining, by the terminal device, a random access process fails due to an LBT failure.

Optionally, as an implementation, the first value is less than the second value.

Optionally, as an implementation, the transceiver 620 is configured to receive configuration information sent by a network device, wherein the configuration information includes the first value and/or the second value.

Optionally, as an implementation, the processor 610 is configured to increase a value of a counter of transmission times of the random access preamble by 1, if the i-th transmission of the random access preamble fails, wherein the counter of the transmission times is used for recording the transmission times of the random access preamble, where i is a positive integer.

Optionally, as an implementation, the processor 610 is configured to: after the value of the counter of the transmission times of the random access preamble is increased by 1, if the value of the counter of the transmission times is less than or equal to the maximum value of the transmission times, perform the (i+1)-th transmission of the random access preamble; or, if the value of the counter of the transmission times is greater than the maximum value of the transmission times, determine that a random access process fails.

Optionally, as an implementation, the processor 610 is configured to determine that a receiving cell of the random access preamble is a primary cell, after determining that the random access process fails; and the transceiver 620 is configured to send an RRC signaling to the network device corresponding to the primary cell, wherein the RRC signaling is used for indicating a radio link failure.

Optionally, as an implementation, the processor 610 is configured to determine whether a first resource in the transmission resource is occupied; if the first resource is occupied, determine whether another resource other than the first resource in the transmission resource is occupied; or, if the first resource is not occupied, use the first resource to execute the i-th transmission of the random access preamble.

Optionally, as an implementation, the processor 610 is configured to: after determining whether the another resource other than the first resource in the transmission resource is occupied if the first resource is occupied, if there is no unoccupied resource in the transmission resource, determine that the i-th transmission of the random access preamble fails.

It should be understood that the terminal device 600 according to the implementation of the present disclosure may correspond to the terminal device 400 in the implementation of the present disclosure and may correspond to a relevant subject that performs the method 200 according to the implementation of the present disclosure, and the above and other operations and/or functions of each unit in the terminal device 600 are respectively for realizing each corresponding flow of the terminal device in the method shown in FIG. 2, and will not be repeated here for the sake of brevity.

Therefore, the terminal device according to the implementation of the present disclosure, sets a maximum value of transmission times of a preamble according to whether a resource of transmitting the preamble belongs to an unauthorized frequency band, and if the resource of transmitting the preamble belongs to an authorized resource, the terminal device sets the maximum value of the transmission times to a first value correspondingly; if the resource of transmitting the preamble belongs to the unauthorized frequency band, the terminal device sets the maximum value of the transmission times to a second value correspondingly, and the first value is different from the second value, for example, the terminal device sets the second value to be greater than the first value, so as to reduce a probability of determining, by the terminal device, a random access process fails due to an LBT failure.

It should be noted that the above method implementations of the present disclosure may be applied to or implemented by a processor. The processor may be an integrated circuit chip with signal processing capability. In the implementation process, the actions of the method implementations described above may be accomplished by integrated logic circuits of hardware in the processor or instructions in the form of software. The above processor may be a general purpose processor, a digital signal processor (DSP), an application specific integrated circuit (ASIC), a field programmable gate array (FPGA), or another programmable logic device, a discrete gate, or a transistor logic device, or a discrete hardware component. The processor may implement various methods, acts and logic block diagrams disclosed in implementations of the present disclosure. The general purpose processor may be a microprocessor, or the processor may be any conventional processor or the like. The actions of the method disclosed in connection with the implementations of the present disclosure may be directly embodied by the execution of the hardware decoding processor, or by the execution of a combination of hardware and software modules in the decoding processor. The software modules may be located in a storage medium commonly used in the art, such as a random access memory, a flash memory, a read-only memory, a programmable read-only memory, or an electrically erasable programmable memory, or a register. The storage medium is located in the memory, and the processor reads the information in the memory and completes the actions of the above method in combination with its hardware.

It should be understood that the memory in implementations of the present disclosure may be a transitory memory or a non-transitory memory, or may include both transitory and non-transitory memories. The non-transitory memory may be a Read-Only Memory (ROM), a Programmable Rom (PROM), an Erasable PROM (EPROM), an Electrically Erasable EPROM (EEPROM), or a flash memory. The transitory memory may be a Random Access Memory (RAM) which serves as an external cache. By illustration of example but not restriction, a RAM is available in many forms such as a Static RAM (SRAM), a Dynamic RAM (DRAM), a Synchronous DRAM (SDRAM), a Double Data Rate SDRAM (DDR SDRAM), an Enhanced SDRAM (ESDRAIVI), a Synchlink DRAM (SLDRAIVI), and a Direct Rambus RAM (DR RAM). It should be noted that the memories of the systems and methods described herein are intended to include, but not limited to, these and any other suitable types of memories.

Those of ordinary skill in the art will recognize that the example elements and algorithm acts described in combination with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. The aforementioned storage medium includes a U disk, a mobile hard disk, a read-only memory, a random access memory, a magnetic disk, or an optical disk, and another medium capable of storing program codes.

What are described above are merely example implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be the protection scope defined by the claims.

I claim:

1. A method for preparing a random access preamble for transmission, comprising:
   performing an i-th transmission of the random access preamble, wherein i is a positive integer greater than 1;
   if the i-th transmission and an (i−1)-th transmission of the random access preamble use a same beam, increasing a value of a power ramping counter of the random access preamble by 1;
   before increasing the value of the power ramping counter of the random access preamble by 1, determining that there is no need to suspend the power ramping counter; and
   if the i-th transmission and the (i−1)-th transmission of the random access preamble use a same synchronization signal block, determining that the i-th transmission and the (i−1)-th transmission of the random access preamble use the same beam.

2. The method according to claim 1, further comprising, before performing the i-th transmission of the random access preamble:
   determining a first preset time-frequency resource in at least one preset time-frequency resource, wherein the first preset time-frequency resource is to be used in the i-th transmission of the random access preamble.

3. The method according to claim 2, wherein determining the first preset time-frequency resource in the at least one preset time-frequency resource comprises:
   determining whether a second preset time-frequency resource in the at least one preset time-frequency resource is occupied; and
   if the second preset time-frequency resource is not occupied, determining the second preset time-frequency resource as the first preset time-frequency resource; or
   if the second preset time-frequency resource is occupied, determining whether another preset time-frequency resource other than the second preset time-frequency resource in the at least one preset time-frequency resource is occupied.

4. The method according to claim 2, wherein determining whether the second preset time-frequency resource in the at least one preset time-frequency resource is occupied, comprises:
   determining an energy value of a signal borne by the second preset time-frequency resource; and
   if the energy value of the signal is less than or equal to a preset energy value, determining that the second preset time-frequency resource is not occupied; or
   if the energy value of the signal is greater than a preset energy value, determining that the second preset time-frequency resource is not occupied.

5. The method according to claim 1, wherein the value of the power ramping counter after the i-th transmission of the random access preamble is to be used in determining an (i+1)-th transmission power of the random access preamble.

6. A terminal device, comprising:
   a transceiver, configured to perform an i-th transmission of a random access preamble, wherein i is a positive integer greater than 1; and
   a processor, configured to:
   increase a value of a power ramping counter of the random access preamble by 1, if the i-th transmission and an (i−1)-th transmission of the random access preamble use a same beam;
   before increasing the value of the power ramping counter of the random access preamble by 1, determine that there is no need to suspend the power ramping counter; and
   if the i-th transmission and the (i−1)-th transmission of the random access preamble use a same synchronization signal block, determine that the i-th transmission and the (i−1)-th transmission of the random access preamble use the same beam.

7. The terminal device according to claim 6, wherein the processor is specifically configured to:
   after the transceiver performs the i-th transmission of the random access preamble, if determining that the i-th transmission of the random access preamble fails, increase a value of a counter of transmission times of the random access preamble by 1, wherein the counter of the transmission times is used for recording the transmission times of the random access preamble.

8. The terminal device according to claim 7, wherein the transceiver is specifically configured to:
   after the processor increases the value of the counter of the transmission times of the random access preamble by 1, if the value of the counter of the transmission times is less than or equal to a maximum value of the transmission times of the random access preamble, perform an (i+1)-th transmission of the random access preamble; or
   if the value of the counter of the transmission times is greater than the maximum value of the transmission times, determine that a random access process fails.

9. The terminal device according to claim 8, wherein
   the processor is further configured to determine a receiving cell of the random access preamble as a primary cell, after the processor determines that the random access process fails;
   the transceiver is specifically configured to:
   send a radio resource control (RRC) signaling to a network device corresponding to the primary cell, wherein the RRC signaling is used for indicating a radio link failure.

10. The terminal device according to claim 7, wherein
    the processor is further configured to determine that a transmission resource for transmitting the random access preamble belongs to an authorized frequency band or an unauthorized frequency band;

the processor is specifically configured to:
- if the transmission resource belongs to the authorized frequency band, set a maximum value of transmission times of the random access preamble to a first value; or
- if the transmission resource belongs to the unauthorized frequency band, set the maximum value of the transmission times to a second value, wherein the first value is different from the second value.

11. The terminal device according to claim 10, wherein the first value is less than the second value.

12. The terminal device according to claim 10, wherein the transceiver is specifically configured to:
  receive configuration information sent by a network device, wherein the configuration information comprises the first value and/or the second value.

13. A terminal device, comprising:
  a transceiver, configured to perform an i-th transmission of a random access preamble, wherein i is a positive integer greater than 1; and
  a processor, configured to:
    increase a value of a power ramping counter of the random access preamble by 1, if the i-th transmission and an (i−1)-th transmission of the random access preamble use a same beam;
    before increasing the value of the power ramping counter of the random access preamble by 1, determine that there is no need to suspend the power ramping counter;
    if the i-th transmission and the (i−1)-th transmission of the random access preamble use a same synchronization signal block, determine that the i-th transmission and the (i−1)-th transmission of the random access preamble use the same beam;
    determine that a transmission resource for transmitting a random access preamble belongs to an authorized frequency band or an unauthorized frequency band; and
    set a maximum value of transmission times of the random access preamble to a first value, if the transmission resource belongs to the authorized frequency band; or
    set the maximum value of the transmission times to a second value, if the transmission resource belongs to the unauthorized frequency band, wherein the first value is different from the second value.

14. The terminal device according to claim 13, wherein the first value is less than the second value.

15. The terminal device according to claim 13, wherein the terminal device further comprises:
  a transceiver, configured to receive configuration information sent by a network device, wherein the configuration information comprises the first value and/or the second value.

16. The terminal device according to claim 13, wherein the processor is specifically configured to:
  if an i-th transmission of the random access preamble fails, increase a value of a counter of transmission times of the random access preamble by 1, wherein the counter of the transmission times is used for recording the transmission times of the random access preamble, where i is a positive integer.

17. The terminal device according to claim 16, wherein the processor is specifically configured to:
  after the value of the counter of the transmission times of the random access preamble is increased by 1, if the value of the counter of the transmission times is less than or equal to a maximum value of the transmission times, perform an (i+1)-th transmission of the random access preamble; or
  if the value of the counter of the transmission times is greater than the maximum value of the transmission times, determine that a random access process fails.

18. The terminal device according to claim 17, wherein the processor is specifically configured to:
  after determining that the random access process fails, determine a receiving cell of the random access preamble as a primary cell;
  the terminal device further comprises:
    a transceiver, configured to send a radio resource control (RRC) signaling to a network device corresponding to the primary cell, wherein the RRC signaling is used for indicating a radio link failure.

* * * * *